United States Patent Office 3,425,299
Patented Feb. 4, 1969

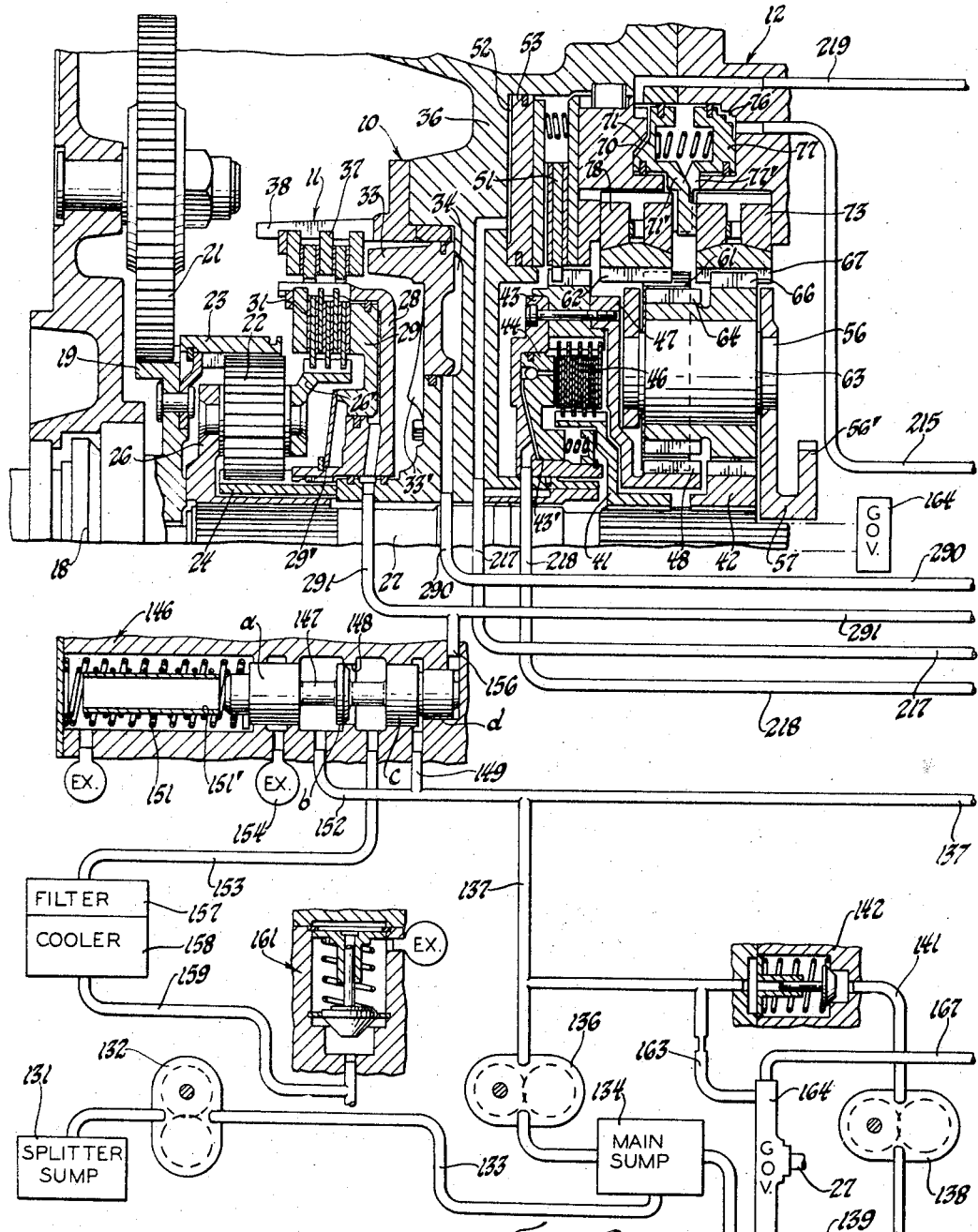

3,425,299
TRANSMISSION
Mark E. Fisher, Carmel, Ind., assignor to General Motors Corporation, Detroit, Mich., a corporation of Delaware
Filed Nov. 25, 1966, Ser. No. 597,073
U.S. Cl. 74—752  11 Claims
Int. Cl. F16h 3/74, 47/00

ABSTRACT OF THE DISCLOSURE

The transmission shown has range gearing and splitter gearing in combination to provide low, intermediate and high range drives in conjunction with one splitter drive and the splitter ratio drive intermediate each range ratio drive and has a manual and automatic control for establishing these ratios. The fluid operated control system selectively supplies fluid to a plurality of range ratio establishing devices to establish low, intermediate and high ratios and a low intermediate signal and an intermediate high signal. A governor supplies governor pressure to the splitter shift valve for controlling the splitter gearing. The governor pressure is positively controlled by two expansible chamber or accumulator devices, one positively moved for charging by the high intermediate pressure signal and for discharging by the low ratio pressure and the other positively moved for charging by the high ratio pressure and for discharging by the low intermediate pressure signal so that on each range upshift one accumulator is positively discharged and on each range downshift one accumulator is positively charged to control the pressure to insure single ratio shifts.

---

Figure 2A:
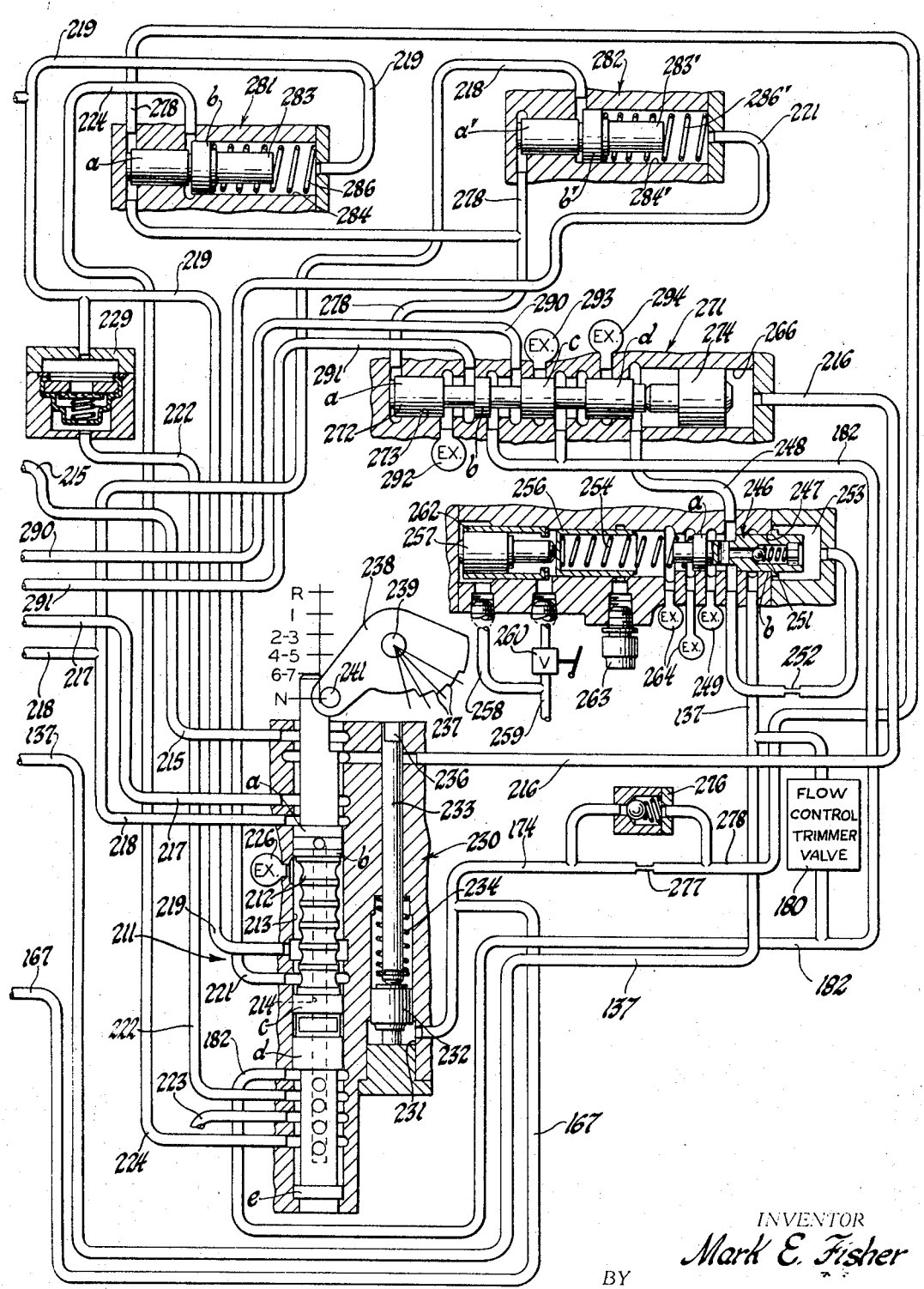

This specification relates to transmissions and more particularly to a control system for ratio change of a multiratio transmission.

The improvement in the controls for a transmission having a speed controlled multiple ratio splitter unit and a manually controlled multiple ratio range gear unit having range ratios each combined with plural splitter ratios for multiple overall ratios, provides a simplified arrangement for insuring single ratio shifts. The control system employs a manual valve having a first position for engaging low in the range unit and low in the splitter unit. With the manual valve in the 2nd–3rd, 4th–5th, 6th–7th and reverse positions, the controls respectively engage the 1st, 2nd, 3rd and reverse ratios in the range unit and permits operation of a governor and throttle controlled splitter shift valve to automatically control the splitter unit and provide two ratios in each of these positions. On manual shifts between the forward drive positions, the governor pressure is controlled by accumulators operative in response to signal pressures provided from the manual valve to provide single step shifts in the transmission on selected range upshift or downshift of the manual valve. The accumulators are positively moved in both directions by signal pressures. In this improved arrangement, one accumulator discharged by the low range signal and charged by the high intermediate range signal, and another accumulator discharged by the intermediate low range signal and charged by a high range signal, modify governor pressure. A fast feed and a more restricted return connection of governor pressure to the splitter shift valve and accumulator provides properly timed overcontrol of governor pressure on range upshifts and downshifts to control the operation of the splitter shift valve so that on a manual range upshift the lower of available splitter ratios is initially engaged, and on a manual range downshift the higher of available splitter ratios is initially engaged and otherwise provide normal speed governor and torque demand controlled splitter shifts. The full flow and restricted passages preferably provide the same rate of increased governor pressure on manual downshifts and decrease of governor pressure on manual upshifts to insure single ratio shifts.

An objects of the invention is to provide in a transmission having a governor controlled multiratio gear unit and a manually controlled multiratio range gear unit combined to provide a plurality of range drives each having a plurality of governor controlled ratios to provide a consecutive series of overall stepped ratios, an improved governor pressure control responsive to manual range ratio change to overcontrol governor pressure to insure consecutive overall stepped ratio changes on range ratio changes.

Another object of the invention is to provide in a transmission having a governor controlled multiratio gear unit and a manually controlled multiratio range gear unit combined to provide a plurality of range drives each having a plurality of governor controlled ratios to provide a consecutive series of overall stepped ratios, improved accumulators to overcontrol governor pressure to insure consecutive overall ratio changes in response to range ratio changes.

Another object of the invention is to provide in a transmission having a governor controlled multiratio gear unit and a manually controlled multiratio range gear unit combined to provide a plurality of range drives each having a plurality of governor controlled ratios to provide a consecutive series of overall stepped ratios, an improved governor pressure supply to the shift valve of the governor controlled gear unit having a fast feed and slow return flow to the shift valve and to accumulators responsive to the manual control for the range unit to control the governor pressure in response to range ratio changes to insure sequential overall ratio shifting.

Another object of the invention is to provide an improved controlled accumulator arrangement to change a control pressure.

Another object of the invention is to provide a pair of identical accumulators operative in response to a plurality of signal pressures to momentarily change a control pressure.

These and other objects of the invention will be more apparent from the following description and drawing of the invention.

FIGURES 2 and 2a, when arranged in accordance with FIGURE 1, diagrammatically show the transmission gearing and the control system therefor.

The transmission unit 10 has an input splitter unit 11 and a range unit 12, as shown in FIGURE 2. The engine drives the input shaft 18 which has fixed thereon a drive gear 19 driving the accessory drive gear 21. The splitter gear set has a plurality of pinions 22 meshing with ring gear 23 driven by gear 19 on the input shaft and with the sun gear 24. The pinions are mounted on a carrier 26 drive connected by splines to the intermediate shaft 27. The control cylinder 28 is drive connected by suitable splines to the sun gear 24 for rotation therewith and is axially fixed. A piston 29 is mounted in the cylinder for movement to engage the direct drive clutch plates 31 which are alternately splined to the cylinder 28 and carrier extension 26' to lock up the gear unit for direct drive. Piston 33 is movable in cylinder 34 in fixed housing 36 and is operable to engage the reaction brake 37 having alternate plates splined to a portion 38 of the fixed housing 36 and the cylinder 28 to be operative on engagement to hold the sun gear 24 for reduction drive. Suitable Belleville reaction springs 29', 33' for pistons 29, 33, are shown.

The intermediate shaft 27 drives the input clutch hub 41 and the rear sun gear 42 of the range gear unit 12. The clutch motor hub 43 is rotatably mounted on the fixed housing and has a cylinder 43' and a piston 44 movably mounted therein to engage the clutch plates 46 which are alternately splined to the input clutch hub 41 and the motor hub 43 which is connected by hub 47 to drive the first sun gear 48 for high or direct drive. The front sun gear 48 is also connected by the hub 47 and motor hub 43 to the reaction brake 51 which is engaged by supplying fluid under pressure to the cylinder 52 in the fixed housing 36 to move the piston 53 to engage brake 51 and thus hold sun gear 48 for intermediate drive. The planetary carrier 56 is drive connected by output gear 56' to drive an output shaft and has mounted thereon a single planetary pinion 61 which meshes with the front sun gear 48 and the front ring gear 62 and a dual planetary pinion 63 having a small forward pinion portion 64 meshing with the single planetary pinion 61 and a rear larger pinion portion 66 meshing with the rear sun gear 42 and the rear ring gear 67. The low motor has a cylinder 70 in the fixed housing and a movable piston 71 having apply fingers 71' operative to move the movable cone ring toward the fixed cone ring of the two-cone brake 73 to hold the rear ring gear 67. When fluid is supplied to the cylinder 76 in the fixed housing to move the piston 77 and the apply fingers 77', the movable cone ring is moved to the left to engage the fixed cone ring of the two-cone brake 78 to hold the ring gear 62 for reverse drive. Each cone brake includes oppositely tapered surfaces on the outer diameter of the ring gear and a pair of ring members splined to the housing and having matching cones on the inner surface, one being axially fixed and the other axially movable by the actuating ring toward the one member to engage the cone brake. The motors have retraction springs as shown.

Low, intermediate and direct drive or high forward drives and reverse drive are provided in the range gear set 12, respectively, by supplying fluid to low motor 70-71 to hold the ring gear 67, by supplying fluid to intermediate motor 52-53 to engage brake 51 to hold sun gear 48, by supplying fluid to clutch motor 43-44 to engage clutch 46 to drive sun gear 48 along with sun gear 42 to lock up the gear unit for direct drive and by supplying fluid to motor 76-77 to hold ring gear 62 to provide reverse drive. Each of the above drives is used with splitter low and high to provide six forward ratio drives and two reverse drives.

FLUID CONTROL SYSTEM

The lower sump 131 of the splitter unit of the transmission is scavenged by scavenge pump 132 which delivers fluid via line 133 to a main sump 134 of the transmission. The input driven pump 136 driven by accessory gear 21 supplies fluid from sump 134 to the main line 137. The output pump 138 supplies fluid via lines 139 from the sump 134 to the pump outlet line 141 which is connected through check valve 142 to supply the main line 137 but prevents reverse flow.

The main line is regulated by the regulator valve 146 which has a valve element 147 having large lands $a$, $b$ and $c$, and a smaller land $d$ located in a stepped bore 148. The main line branch 149 is connected between lands $c$ and $d$ to act on the differential area of land $c$ to move the valve element against the dual biasing spring 151 located in the exhausted end of the bore. The stop sleeve 151' is in friction contact with the inner spring to damp the spring and support the stop sleeve. The main line branch 152 is connected between the lands $a$ and $b$ and initially is connected to overage line 153 and if this is insufficient to exhaust 154 to regulate the pressure in main line 137. Splitter high pressure is connected by branch 156 to act on land $d$ to decrease main line pressure in splitter high ratio. The overage line 153 is connected through filter 157 and cooler 158 to a lube line 159 connected to lubricate the transmission at a pressure controlled by relief valve 161. The main line is also connected by a restrictive branch 163 to a paddle wheel governor as shown in Schaefer patent application S.N. 438,634, now Pat. No. 3,378,119 filed Mar. 10, 1965, or a pitot governor 164, as shown in Christenson Patent No. 3,255,642, driven by the splitter output shaft 27 and thus supplying to the governor line 167 a pressure proportional to splitter output speed.

The main line 137 is connected to the ratio feed line 182. This connection preferably includes a flow control and trimmer valve 180 as shown by flow valve 465 and trimmer valve 640 in Christenson Patent 3,255,642, which in response to flow to any ratio establishing motor will reduce pressure in the ratio feed or trimmed main line and gradually increase the pressure to the main line pressure to provide soft ratio engagement on each shift.

The manual control valve 211 (FIGURE 2a) connects the trimmed main line 182 to the ratio and signal lines and has a valve element 212 manually moved in bore 213. The trimmed main line 182 is connected at all valve positions to the space between the lands $d$ and $e$ via bore 214 closed at both ends to the space between the lands $c$ and $d$ and the space between the lands $a$ and $b$ to selectively feed reverse clutch line 215, first signal line 216, intermediate clutch line 217, high clutch line 218, low clutch line 219, intermediate low signal line 221, low exhaust line 222, steer signal line 223 which is not used in the range unit and is thus blocked but may be used in a cross drive control as shown in Raymond J. Maci et al. application Ser. No. 597,053 and high intermediate signal line 224 in each of the valve positions neutral, 6th–7th ratio, 4th–5th ratio, 2nd–3rd ratio, 1st ratio and reverse ratio as shown by the X's in the following table and to exhaust the other lines at either end of the valve body or central exhaust 226.

| Man v. Pos. | Rev. Cl. 215 | 1st Sig. 216 | Int. Cl. 217 | Hi Cl. 218 | Lo Cl. 219 | Int.-Lo Sig. 221 | Lo Ex. 222 | Steer Sig. 223 | Hi Int. Sig. 224 | Acc. Lo 281 | Acc. Hi 282 |
|---|---|---|---|---|---|---|---|---|---|---|---|
| N   |   |   |   |   |   |   | X | X | X | C  | D  |
| 6-7 |   |   |   |   | X |   | X | X | X | C  | *C |
| 4-5 |   |   | X |   |   | X | X | X | X | *D | *D |
| 2-3 |   |   |   | X |   | X | X | X |   | D  | D  |
| 1   |   | X |   |   | X |   | X |   |   | D  | D  |
| R   | X |   |   |   | X |   |   |   |   | D  | D  |

Low exhaust line 222 is connected by check valve 229 to low clutch line 219 preventing flow fluid under pressure from low exhaust line to the low clutch line and permitting flow from the low clutch line to the low exhaust line when the low exhaust line is exhausted. A conventional ball detent engages the grooves in the center portion of valve element 212 to resiliently hold the valve element in each of the above positions.

In the downshift inhibitor 230, the governor pressure line 174 is connected to the closed end of bore 231 to act on the valve element 232 which, with increasing governor pressure, moves the follower rod 233 upwardly against the bias of spring 234 so that the cam follower rod end 236 engages the steps 237 of cam 238 which is pivoted to the valve housing by pin 239 and connected by pin 241 to move with the valve element 212. The governor pressure positions the follower rod end 236 with respect to step 237 to prevent a manual downshift of the shift valve at speed sufficiently high to prevent dangerous overspeed operation of the transmission gearing.

The torque demand control valve 246 has a regulator valve element 247' having lands $a$ and $b$ located in a uniform bore 247. Main line pressure supplied from main line 137 is regulated and supplied to the torque demand signal line 248 and excess pressure vented to exhaust 249. The torque demand pressure in line 248 is connected by one-way check valve 251 and restricted bypass 252 to the chamber 253 where it acts on the end of valve element 246 to urge the valve element against the biasing spring 254 which is seated in the movable abutment cylinder 256. A plug 257 having a smaller diameter than cylinder 256 is located in the small closed end bore portion 262. Gasifier pressure from the gas turbine compresses discharge, as shown in Spreitzer et al. Patent No. 3,093,010, is supplied via line 258 to the bore behind plug 257 to bias the plug to move the abutment cylinder to vary the spring bias and thus torque demand pressure in line 248 in accordance with gasifier pressure. The gasifier pressure line 258 is also connected via branch line 259 controlled by manual throttle actuated on-off valve 260 to act directly on abutment cylinder 256 to increase the torque demand pressure at all gasifier pressures for a forced downshift at a high or full throttle position. Atmospheric vent 263 permits escape of gasifier gas without frothing the oil. Exhausts 264 vent leakage oil from the bore.

Splitter shift valve 271 has a valve element 272 having lands $a$, $b$, $c$ and $d$ located in a bore 273 and a control plug 274 located in an enlarged closed bore portion 266. The amplified governor line 174 is connected in parallel through a one-way check valve 276 to permit supply to the splitter governor line 278 and a restricted passage 277 to permit freer flow to the splitter governor line 278; and more restricted flow from the splitter governor line. The splitter governor line is also connected to the low accumulator 281 and the high accumulator 282. Low accumulator 281 has a piston 283 having land $a$ and larger land $b$ located in a stepped bore 284 and is biased to discharged position by spring 286. The similar high accumulator 282 has a piston 283' with lands $a'$ and $b'$ in stepped bore 284' and is biased to disharged position by spring 286'. Splitter governor pressure is connected to the small end of bores 284, 284', respectively, of valves 281, 282 and is controlled by movement of the accumulators between charged and discharged (shown) positions. The high intermediate signal pressure line 224 is connected at the step of the bore to act on the differential area of land $b$ of accumulator 281 to quickly move the valve element to the charged position providing a momentary reduction in the splitter governor pressure. High clutch pressure line 218 is similarly connected to valve 282 to act on the differential area of land $b'$ to put the accumulator in charged position. The accumulator 281 is quickly moved to a discharged position by low clutch pressure 219 which is connected to the closed spring chamber to act on land $b$ of accumulator 281. Accumulator 282 is similarly moved by intermediate low signal pressure line 221 which is connected to closed spring chamber and acts on land $b'$ of valve 282. The above chart in the columns accumulator (Acc. 281 and 282) indicate when the accumulators are charged (C) and discharged (D) and the asterisk indicates the changes.

With the splitter shift valve element 272 in the downshift position, trimmed pressure line 182 is connected between lands $b$ and $c$ to the splitter low line 290 to actuate the splitter low motor 33–34 and the splitter high motor 28–29 is connected by line 291 to exhaust 292 for disengagement. When the manual valve is in the first ratio position fluid pressure supplied to the first signal line 216 acts on the free end of control plug 274 to hold the valve in the position shown and there are no upshifts. In other positions of this valve line 216 is exhausted and the valve is free to move under the joint action of the torque demand pressure in line 248 acting on the free end of land $d$ and the splitter governor pressure line 278 acting on the free end of land $a$ which under proper speed and torque demand conditions will upshift the valve 271 to connect trimmed line 182 to the splitter high line 291 and connect splitter low line 290 to exhaust 293. Land $b$ is larger than land $c$ and land $c$ is larger than land $d$ so in downshift position shown there are two hysteresis forces holding the valve 272 in the downshift position which are vented to respectively, exhausts 293 and 294 so a downshift occurs at a lower governor pressure and speed. The hysteresis force between lands $c$ and $d$ is unaffected by flow to a motor and thus is effective immediately. Lands $a$ and $b$ are the same diameter so no hysteresis force is provided in the upshift position.

With the manual valve in first ratio position, splitter shift valve 271 is locked in low position by first signal pressure 216, accumulator valve 281 is held in the discharged position by the spring and low pressure 219 and accumulator valve 282 is biased by the spring to the discharged position. On a manual shift to the 2nd-3rd ratio position, first signal line 216 is exhausted permitting free operation of the shift valve and the accumulators 281, 282 remain disharged. Intermediate low signal pressure 221 also supplies fluid to accumulator 282 so both accumulators are positively discharged by control fluid. This manual valve change merely conditions the splitter shift valve for normal speed and torque demand shifting. On a 2–3 ratio position to 4–5 ratio position shift of the manual shift valve, low clutch line 219 is exhausted and high intermediate signal line 224 is supplied so that accumulator 281 is moved to the charged position momentarily reducing splitter governor pressure in line 278 and downshifting the splitter shift valve to insure a 3–4 shift as opposed to a 3–5 shift. Intermediate low signal pressure, being present in both 2–3 and 4–5 positions of the manual valve, holds the accumulator valve 282 in discharged position in both manual positions. On a 4–5 ratio to 6–7 ratio manual ratio valve shift, the intermediate low signal line 221 is vented and the high clutch line 218 pressure moves accumulator 282 to the charged position lowering pressure in splitter governor line 278 to insure a 5–6 shift. The high intermediate signal pressure line 224 is pressurized and low clutch line 219 is exhausted in both the 4–5 and 6–7 positions, thus accumulator 281 remains in the charged position. On a downshift from the 6–7 to the 4–5 ratio position of the manual valve, high clutch line 218 is vented and intermediate low signal line 221 supplied to quickly discharge the accumulator 282 to momentarily increase the splitter governor pressure to insure a 6–5 rather than a 6–4 downshift. The high intermediate signal remains supplied holding the accumulator 281 in the charged position, but on a shift to the 2–3 position, this line is vented and the low clutch line 219 acts to discharge the accumulator to provide a 4–3 downshift. Thus, the movement of each accumulator, as described above and indicated by the asterisk in the above table, is positive under a signal or control pressure at the main line pressure value to instantly provide a uniform governor pressure increase or decrease. The swept volume of the governor pressure chamber of each accumulator is substantially larger than the swept volume of the governor chamber of the splitter shift valve. The governor line 278, fed by check valve 276 and restricted passage 277, provides a sufficient volume of flow for normal operation of the shift valve without reduction of governor pressure but a partially restricted flow so that the governor pressure is momentarily substantially reduced during the charging of an accumulator to downshift the splitter shift valve during range upshifts. The accumulators discharge governor fluid on range downshifts and, due to the more restricted or smaller restricted passage 277, governor pressure increases to upshift the splitter shift valve. On the 1 to 1–2 shift, there is no range shift and the accumulators do not function. Also, on a shift to reverse the accumulators do not function. On a neutral to 6–7 shift, accumulator 282 is charged to provide a shift to 6th.

This invention may be modified within the scope of the appended claims.

I claim:

1. In a transmission; transmission gearing having a plurality of drive establishing means selectively operable to provide a plurality of range ratio drives and a splitter ratio intermediate each range ratio drive, governor means providing a fluid pressure governor signal varying with speed, range shift means operably connected to operate said drive establishing means for upshifting and downshifting to selectively establish each of said plurality of range ratio drives, splitter shift means operatively connected to said governor means and actuated by a change of said governor pressure for upshifting and downshifting to selectively move between an upshift and downshift position to selectively engage said range ratios in one position and to engage said intermediate splitter ratios in another position, and pressure control means having expansible chamber means operatively connected to said governor means and having a servo actuator means operatively connected to said expansible chamber means and said range shift valve means operative in response to a range upshift and a range downshift to actuate said servo actuator means to apply an increasing volume force and a decreasing volume force to said expansible chamber means to positively increase and decrease respectively the volume of said expansible chamber at a predetermined rate to provide a predetermined change of said governor pressure to control said splitter shift means to insure single ratio shifts during range shifts.

2. The invention defined in claim 1 and said range shift valve providing a plurality of signal pressures connected to said servo actuator means and a change of signal pressures between successive shift positions on both an upshift and a downshift to positively move said servo actuator means by one signal pressure to increase and another signal pressure to decrease the volume of said expansible chamber.

3. The invention defined in claim 1 and said splitter shift means having a governor actuator having an expansible receiver to receive governor pressure to actuate said splitter shift means, and said expansible chamber means having a swept volume significantly larger than the swept volume of the governor actuator receiver of said splitter shift valve so the change of volume of said expansible chamber positively controls governor pressure.

4. The invention defined in claim 1 and flow control means providing restricted flow in one direction and full flow in another direction, said pressure control means also including passage means connecting said governor means through flow control means to said splitter shift means and said expansible chamber means.

5. The invention defined in claim 4 and said splitter shift means having a governor actuator having an expansible receiver and said flow control means providing restricted flow in the direction to expand said expansible receiver and restricted flow in the direction to contract said expansible receiver.

6. The invention defined in claim 1 and a source of fluid connected to said range shift means, said expansible chamber means consisting of two identical accumulators each having an accumulator chamber connected to said governor means to receive said governor pressure and said servo actuator means having charge and discharge fluid actuators connected to receive fluid from said range shift means to positively discharge one accumulator on each range upshift and positively charge one accumulator on each range downshift.

7. The invention defined in claim 6 and flow control means providing restricted flow in one direction and full flow in another direction, said pressure control means also including passage means connecting said governor means through flow control means to said splitter shift means and said expansible chamber means.

8. In a transmission, transmission gearing having a plurality of fluid operated drive establishing means selectively operable to provide low, intermediate and high range ratio drives and a splitter ratio intermediate each range ratio drive, governor means providing a fluid pressure governor signal varying with speed, a source of fluid pressure, range shift valve means operably connected to said source and selectively providing low, intermediate and high ratio pressures and connecting said pressures selectively to said drive establishing means for upshifting and downshifting to selectively establish said low, intermediate and high range ratio drives in low, intermediate and high positions and to provide a low intermediate pressure signal in low and intermediate drives and an intermediate high signal in intermediate and high drives, splitter shift valve means operatively connected to said governor means and actuated by a change of said governor pressure for upshifting and downshifting to selectively move between an upshift and downshift position to selectively connect said source to drive establishing means to complete said range ratio drives in one position and to engage said intermediate splitter ratios intermediate each range ratio drive in another position, and pressure control means having expansible chamber means including a first and second accumulator each having an accumulator chamber connected to said governor to receive said governor pressure and a discharge spring, said first accumulator having a charge actuator chamber connected to said high intermediate pressure signal and a discharge actuator chamber connected to said low ratio pressure and said second accumulator having a charge actuator chamber connected to said high ratio pressure and a discharge actuator chamber connected to said low intermediate pressure signal to positively discharge one accumulator on each range upshift and positively charge one accumulator on each range downshift to positively increase and decrease the volume of said expansible chamber to change said governor pressure to control said splitter shift means to insure single ratio shifts during range shifts.

9. The invention defined in claim 8 and said splitter shift means having a governor actuator having an expansible receiver to receive governor pressure to actuate said splitter shift means and said accumulator chamber having a substantially larger swept volume than said governor actuator receiver.

10. The invention defined in claim 9 and flow control means providing restricted flow in one direction and full flow in another direction located between said governor means and said accumulator chambers and expansible chamber to provide restricted flow to said chambers and full flow from said chambers.

11. The invention defined in claim 10 and said governor pressure being substantially less than said source pressure.

References Cited

UNITED STATES PATENTS 2,722,296 11/1955 Stoeckicht.
3,138,971 6/1964 Fisher et al.

ARTHUR T. McKEON, *Primary Examiner.*

U.S. Cl. X.R.

74—868